United States Patent [19]
Godin

[11] 3,720,449
[45] March 13, 1973

[54] UNITARY RESILIENT GUIDE MEMBER
[75] Inventor: Edmund J. Godin, Detroit, Mich.
[73] Assignee: Kedsell Company, Detroit, Mich.
[22] Filed: June 22, 1970
[21] Appl. No.: 48,272

[52] U.S. Cl. ............... 308/3 R, 301/63 PW, 308/6 R
[51] Int. Cl. ................................................. F16c 17/00
[58] Field of Search............... 308/3.8, 6; 301/63 PW;
152/323, 324, 325, 326, 327, 74; 16/107;
312/341; 267/141

[56] References Cited

UNITED STATES PATENTS

| | | | |
|---|---|---|---|
| 3,269,717 | 3/1972 | Beck | 267/141 |
| 1,326,144 | 12/1919 | Spross | 152/74 |
| 3,243,237 | 3/1966 | Sprecler | 308/3.8 |
| 3,301,610 | 1/1967 | Packett | 308/3.8 |
| 1,438,207 | 12/1922 | Aldrich | 152/74 |
| 2,978,277 | 4/1961 | Gaudry | 152/324 |
| 2,730,222 | 1/1956 | Klein | 301/63 PW |
| 2,878,074 | 3/1959 | Cawl | 301/63 PW |
| 3,361,489 | 1/1968 | Gionet | 308/6 |
| 3,360,300 | 12/1967 | Carter | 301/63 PW |

Primary Examiner—Charles J. Myhre
Assistant Examiner—Ronald H. Lazarus
Attorney—Whittemore, Hulbert & Belknap

[57] ABSTRACT

A unitary resilient guide member including two transversely spaced apart portions connected together for resilient movement toward and away from each other is disclosed. One of the two transversely spaced apart portions includes a hub part for connection to a window regulator member and a radially extending flange part at one end of the hub part. The other of the two transversely spaced apart portions, which is annular, and the flange part of the one portion are connected together by angularly spaced apart double cantilever portions which permit the resilient movement of the flange part and annular portion toward and away from each other. In one embodiment the guide member is a roller and is adapted to fit within a window regulator track member having a C-shaped cross section, while in another configuration the guide member is a slide and is adapted to be slidably secured between a pair of T-shaped window regulator track cross sections.

7 Claims, 4 Drawing Figures

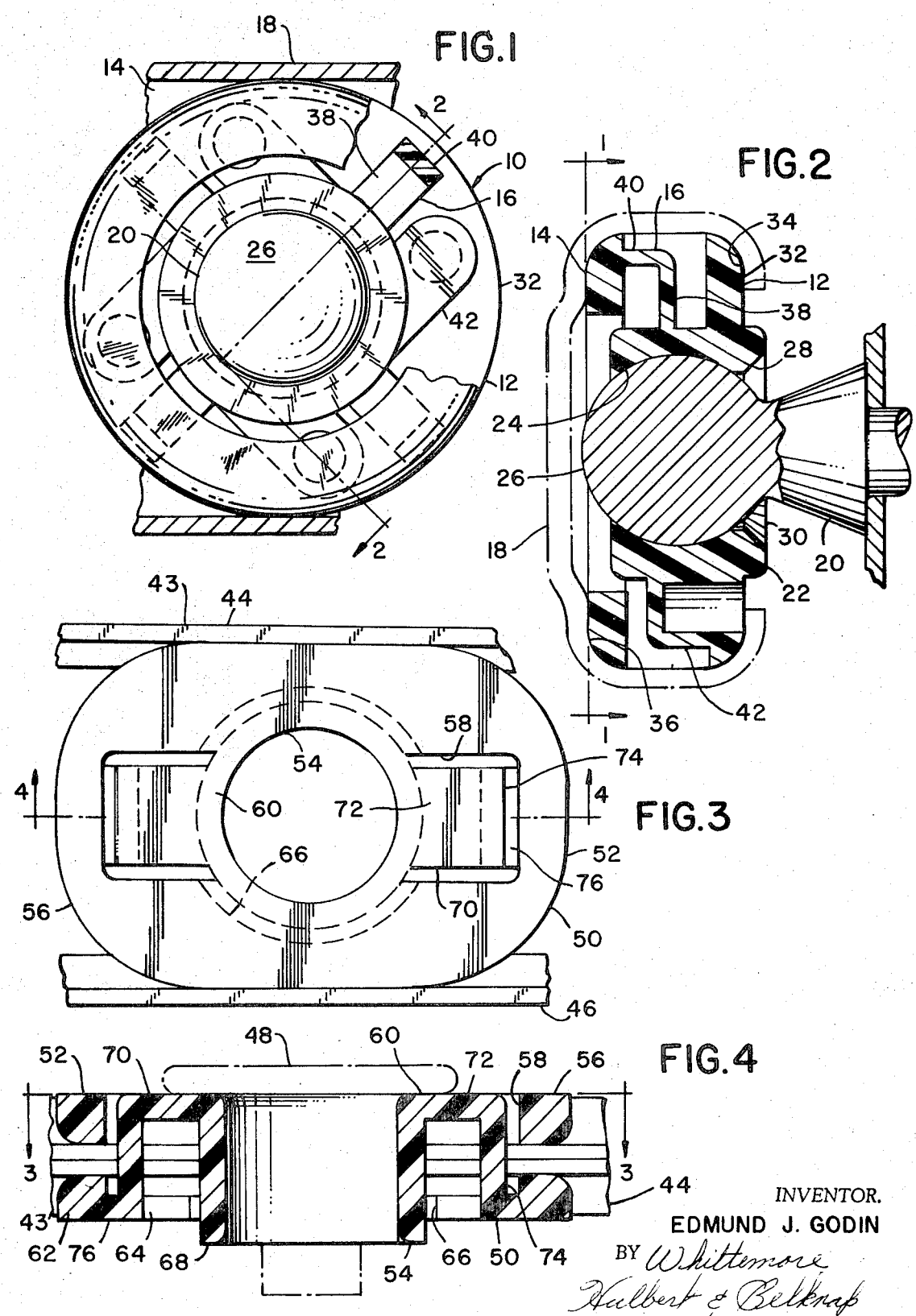

UNITARY RESILIENT GUIDE MEMBER

BACKGROUND OF THE INVENTION

1. Field Of The Invention

The invention relates to resilient structures effected by a double cantilever structure and refers more particularly to a unitary resilient guide member for use in automobile window regulator structures or the like which includes a pair of transversely spaced apart portions, one of which is connected to the other by means of angularly spaced apart double cantilevered portions for relative resilient movement.

2. Description of the Prior Art

In the past, window regulator guide members have often been metal which in metal to metal contact with tracks of window regulator structures have sometimes led to undue wear of either the track or guide member. In addition, the metal tracks and guides have often caused excessive rattling in assembly due to the manufacturing tolerances allowed in the guides or in the tracks in which the guides are installed.

The use of self-lubricating plastic guide members has reduced the wear problem somewhat in the past. Rattling of the window regulator structure has also been overcome by producing the guide members in separate parts urged toward or away from each other depending upon the installation by separate, usually metal spring means. Such construction, while preventing objectionable wear and rattling, is more expensive to construct and assemble than prior unitary guide members.

SUMMARY OF THE INVENTION

In accordance with the invention, a unitary resilient guide member is provided. The unitary resilient guide member of the invention includes portions which are resiliently spaced apart with respect to each other by particularly efficient unitary double cantilevered structure. Depending on the track structure with which the guide member of the invention is to be used, the transversely spaced apart members may be either resiliently urged toward each other or away from each other in installation to grip the track with a required force to prevent rattling and wear. The resilient guide member of the invention is a one-piece plastic construction so that objectionable manufacturing and assembling costs are eliminated.

BRIEF DESCRIPTION OF THE DRAWINGS

FIG. 1 is a partially broken away end view of a unitary resilient guide roller for window regulator structure constructed in accordance with the invention in assembly with a track of the window regulator structure and taken substantially on line 1—1 in FIG. 2.

FIG. 2 is a section view of the unitary resilient guide roller illustrated in FIG. 1 taken substantially on the line 2—2 in FIG. 1 and illustrating the guide roller in assembly with window regulator structure.

FIG. 3 is an end view of a unitary resilient slide for window regulator structure constructed in accordance with the invention in assembly with a track of the window regulator structure and taken substantially on line 3—3 in FIG. 4.

FIG. 4 is a section view of the unitary resilient slide illustrated in FIG. 3 taken substantially on the line 4—4 in FIG. 3 and illustrating the slide in assembly with window regulator structure.

DESCRIPTION OF THE PREFERRED EMBODIMENTS

The unitary resilient guide roller 10 illustrated in FIGS. 1 and 2 includes a first portion 12 and a second portion 14 positioned in spaced apart relation and resiliently secured together by the angularly spaced apart double cantilevered portions 16. As shown best in FIG. 2, the guide roller 10 is mounted in a window regulator structure track 18 and is connected to a window regulator structure ball joint member 20.

The first transversely spaced apart portion 12 includes a generally cylindrical hub part 22 having a radial inner surface 24 which is a spherical segment to receive the ball portion 26 of the window regulator ball joint member 20 which may be inserted therein through the beveled portion 28 of the inner surface of the hub 22 illustrated at the one end 30 of the hub part 22 of the portion 12. The first portion 12 of the guide roller 10 further includes a radially outwardly extending flange part 32 extending from adjacent the one end 30 of hub part 22 and engaging one inner surface 34 of the C-shaped cross section of the window regulator structure track 18.

The second transversely spaced apart portion 14 of the unitary resilient guide roller 10 is annular and engages the inner surface 36 of the C-shaped window regulator structure track 18 as shown best in FIG. 2.

The angularly spaced apart double cantilevered portions 16 of the unitary resilient guide roller 10 each include a part 38 extending radially outwardly of the hub part 22 and a part 40 extending axially of the hub part 22 of the annular portion 14 of the guide roller 10, again as best shown in FIG. 2.

Double cantilever as used herein is intended to define structure in which two simple cantilevered members extending at least partly transversely of each other are secured together at what would be considered the free end of the simple cantilevered members, the other ends of which are substantially fixed.

Abutment portions 42 are positioned in angularly spaced apart relation between the double cantilevered portions 16 and are operable to limit movement of the annular second portion 14 toward the flange part 32 of the first portion in use. The abutment portions 42 are hollow in the interest of conserving the plastic resin of which the unitary resilient guide roller may be constructed which may be an Acetal, Homopolymer or Copolymer such as, for example, Celcon or Delrin or other similar suitable plastic material such as Nylon.

In use, the unitary resilient guide roller 10 is assembled with the window regulator ball joint member 20, after which it is inserted in the C-shaped window regulator structure track 18 from one end thereof. To insert the guide roller 10 in the track 18, it will be necessary to compress the second annular portion 14 of the guide roller toward the first portion 12 or more specifically toward the flange part 32 of the guide roller 10. The double cantilevered portions 16 including the separate parts 38 and 40 at right angles to each other resist the movement of the annular portion toward the flange part 32 with a force depending on the physical dimensions of the cantilevered parts 38 and 40 and the dimensions of the guide roller 10 and track 18.

Due to the construction of the double cantilevered portions 16, it has been found that the required engagement of the track 18 and the guide roller 10 may be obtained at acceptable force within the usual tolerances OF the unitary resilient guide roller and track 18 to prevent rattling between the roller and track. In addition, the required force is maintained over the normal life of automobile window regulator structures.

The unitary resilient slide structure 50 illustrated in FIGS. 3 and 4 is similar to the roller structure of FIGS. 1 and 2 but is particularly adapted for use with tracks having a pair of T-shaped cross sections placed in the configuration illustrated. As shown, the track 43 includes the two T-shaped cross section portions 44 and 46 wherein the stem parts extend toward each other. The window regulator member 48 assembled with the slide 50 is a headed member again adapted to be secured to additional window regulator structure, not shown.

The unitary resilient slide 50 again includes a first portion 52 having a hub part 54. The generally rectangular part 56 of the slide portion 52 has the rectangular opening 58 therein located centrally thereof. The hub 54 and rectangular portion 56 of the slide portion 52 are integral at the sides of the one end 60 of the hub 54 centrally of the rectangular opening 58, as shown.

The second portion 62 of the unitary resilient slide 50 is also generally rectangular and has a rectangular opening 64 centrally thereof which is enlarged into a circular opening 66 to allow the end 68 of the hub 54 to extend therethrough.

Again, the portion 62 is supported in transversely spaced relation to the part 56 of the portion 52 of slide 50 by the double cantilevered portions 70. The double cantilevered portions 70 extend from the end 60 of the hub 54 radially therefrom in opposite directions in parts 72. The portions 70 then extend axially of the hub in parts 74 and finally are connected to the portion 62 of the slide 50 by the parts 76 extending radially of the hub 54.

In use, the portion 62 and the part 56 of the portion 52 of slide 50 are maintained in a predetermined position by the double cantilever connecting portions 70 and in the case of the slide 50 are thus urged toward each other when the slide 50 is engaged with the guide 44 as, for example, from one end thereof by spreading the transversely spaced apart portion 62 and the part 56 of the portion 52. As before, the slide 50 which is unitary and therefore requires no assembly itself slides easily along the track 43 against frictional resistance which depends upon the particular strength of the cantilevered portions 70 and permits no rattling in assembly.

While two embodiments of the present invention have been disclosed in detail, it will be understood that other embodiments and modifications of the invention are contemplated by the inventor. The double cantilevered supporting structure would appear to have particular advantages in other structures and is considered by itself to be an important feature of the invention. It is the intention to include all embodiments and modifications of the invention as are suggested by the above disclosure within the scope of the appended claims.

What I claim as my invention is:

1. Unitary resilient guide structure for an automobile window regulator comprising a first and second portion in spaced apart relation, said first portion including a generally cylindrical hub part having an opening therein for receiving a window regulator member and an annular flange part secured adjacent one end of the hub, said second of the spaced apart portions including an annular part positioned adjacent to the other end of the hub part of the first portion in transversely spaced apart relation to the flange part of the first portion and cantilevered portions spaced angularly about the hub part and connected at the opposite ends thereof to the spaced apart portions for resiliently securing the spaced apart portions together extending first radially of the hub part and then parallel to the axis of the hub part into engagement with the second portion of the guide structure to provide a double cantilevered connection between the spaced apart portions of the guide structure to permit resilient movement thereof toward and away from each other.

2. Structure as set forth in claim 1 and further including abutments extending from the flange of the first portion of the roller along the hub toward the second portion of the roller positioned angularly between the cantilevered portions of the roller for limiting the movement of the spaced apart first and second portions toward each other.

3. Unitary resilient guide roller structure for an automobile window regulator comprising a first and second portion in spaced apart relation, said first portion including a generally cylindrical hub part having an opening therein for receiving a window regulator member and a flange part secured adjacent one end of the hub, said second of the spaced apart portions including a part positioned adjacent to the other end of the hub part of the first portion in transversely spaced apart relation to the flange part of the first portion and four cantilevered portions connected at the opposite ends thereof to the spaced apart portions for resiliently securing the spaced apart portions together extending perpendicularly to each other and spaced 90° apart around the hub part extending first radially of the hub part substantially centrally of the hub part and then parallel to the axis of the hub part into engagement with the second portion of the roller to provide a double cantilevered connection between the spaced apart portions of the guide roller to permit resilient movement thereof toward and away from each other.

4. Structure as set forth in claim 3 wherein the opening in the hub part is a spherical segment and the window regulator member has a spherical ball joing end adapted to be received within the spherical segment.

5. Structure as set forth in claim 3 wherein the flange of the first portion and the other of the spaced apart portions are annular.

6. Structure as set forth in claim 3 wherein there are four of the cantilevered portions spaced angularly about the hub angularly 90° from each other.

7. Structure as set forth in claim 3 and further including abutments on the first portion engageable with the second portion on relative movement of the flange of the first portion and the second portion in one direction to limit the relative movement thereof in the one direction.

* * * * *